Feb. 24, 1959 E. J. LEUTHOLD 2,874,486
AIRCRAFT TRAINING INSTRUMENT FOR SIMULATING ATTITUDE GYRO
Filed July 9, 1956 2 Sheets-Sheet 1

INVENTOR
EDGAR J. LEUTHOLD
BY
HIS ATTORNEY

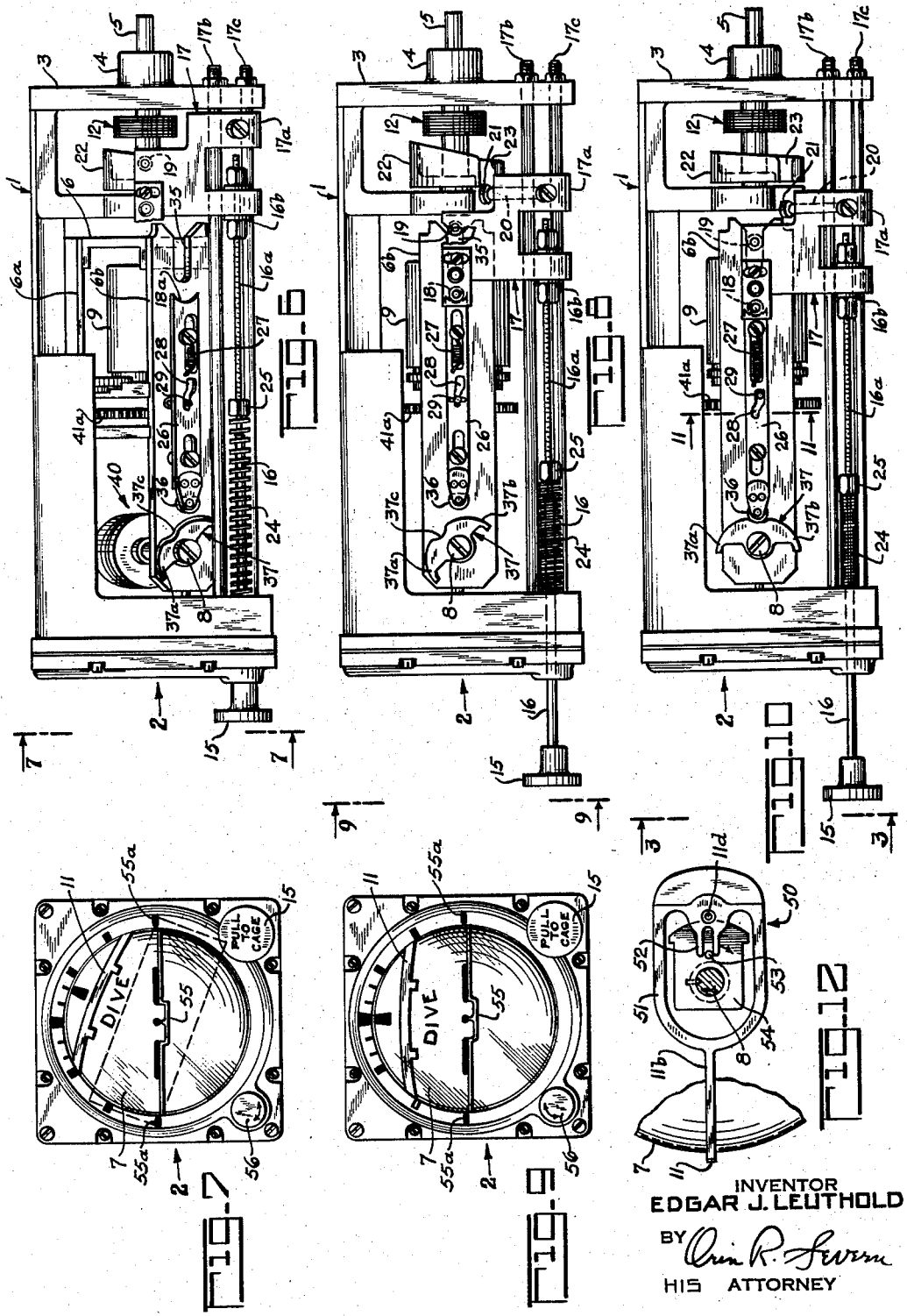

United States Patent Office 2,874,486
Patented Feb. 24, 1959

2,874,486
AIRCRAFT TRAINING INSTRUMENT FOR SIMULATING ATTITUDE GYRO

Edgar J. Leuthold, Wood-Ridge, N. J., assignor to Curtiss-Wright Corporation, a corporation of Delaware Application July 9, 1956, Serial No. 596,612

6 Claims. (Cl. 35—12)

This invention relates to ground-based apparatus for training aircraft personnel, and in particular to apparatus for simulating the operation and characteristics of an attitude gyro of the type requiring mechanical resetting or centering, such as prior to take-off.

By way of example, an attitude gyro of this general type that is commonly used in large aircraft is known as type J-8. This type includes the well-known ball and horizon bar and requires "caging" in contrast to the so-called free gyro. When the gyro is deenergized, it tends to "tumble" so that the instrument may appear in various positions when the aircraft is grounded and the gyro inoperative. In actual flight procedure prior to take-off, the J-8 gyro is first brought up to speed and then, assuming that the airplane is in normally level position, the gyro is manually centered and erected so that its axis is vertical. This operation is performed by the pilot pulling forceably a control knob on the instrument panel. The instrument now appears with the ball and horizon bar perfectly centered.

Simulation of this type gyro has been difficult for various reasons including the necessity for maintaining calibration of the servo apparatus used to position the roll and pitch indicators according to simulated roll and pitch attitudes, the force requirements for simulating erection of the gyro, and related design problems.

A principal object of the invention therefore is improved apparatus for simulating the operation and general characteristics of the aforesaid type of attitude gyro that is accurate and realistic, both as regards appearance and pilot operation, and that combines an efficient, simple design with compact and rugged construction for training purposes.

The invention will be more fully set forth in the following description referring to the accompanying drawings and the features of novelty will be pointed out with particularity in the claims annexed to and forming a part of this specification.

Referring to the drawings, Fig. 1 is a plan view, partly broken away, of attitude gyro simulating apparatus embodying the present invention;

Fig. 6 is a side view, generally similar to Fig. 2, with the gyro in un-centered position prior to a centering or resetting operation;

Fig. 7 shows the instrument face corresponding to Fig. 6 taken along the line 7—7 thereof;

Fig. 8 is another side view illustrating initiation of resetting and completion of roll centering;

Fig. 9 illustrates the instrument face corresponding to Fig. 8 taken along the line 9—9 thereof;

Fig. 10 is another side view illustrating the completion of the resetting operation corresponding to the instrument position of Fig. 3;

Fig. 12 is a detail view illustrating the means for positioning the horizon bar taken along line 12—12 of Fig. 1.

Figure 1:
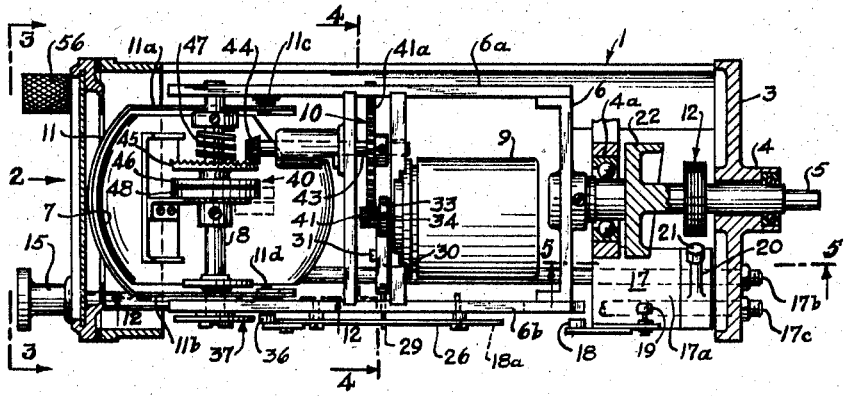
Figure 2:
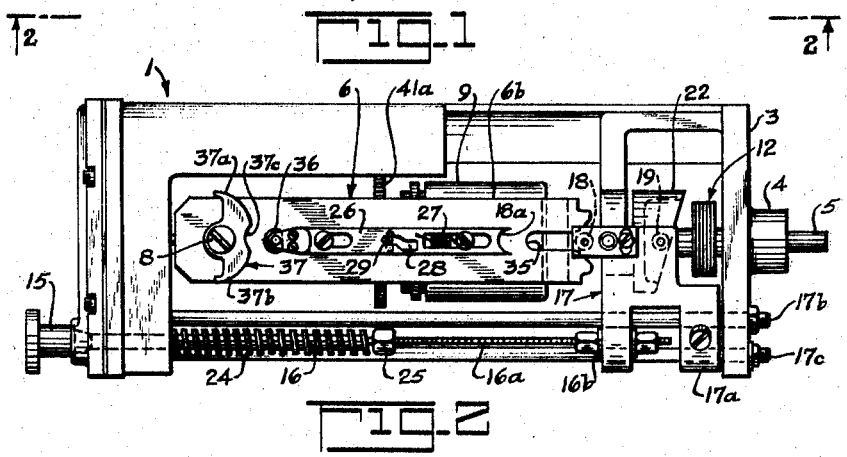
Fig. 2 is a side view of the aforesaid apparatus taken along the line 2—2 of Fig. 1.
Figures 3, 4, 5:
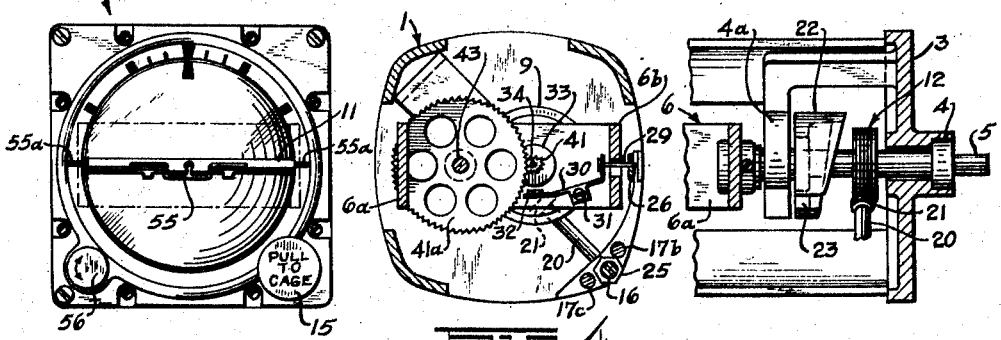
Fig. 3 is a front view of the instrument face and panel taken along the line 3—3 of Fig. 1.
Fig. 4 is a detail view showing the brake mechanism in inoperative position taken along the line 4—4 of Fig. 1.
Fig. 5 is a detail view showing the roll centering means taken along the line 5—5 of Fig. 1.

Referring to Figs. 1 and 2, the basic structure of the simulated attitude gyro, hereinafter referred to as "gyro," comprises an elongated frame or casing 1 having an instrument face or panel 2 at one end and a wall 3 at the opposite end forming a bearing support 4 for a shaft 5 that carries at one end within the casing simulated gyro apparatus to be described. The shaft 5 at the other end extends exteriorly of the casing and is operatively connected to apparatus (not shown) such as a servomotor adapted to rotate the shaft according to simulated roll of an aircraft. The shaft within the casing is connected to gimbal structure including a yoke or cradle 6 that in turn supports the "ball" 7 on a shaft 8 mounted in and between the arms 6a and 6b of the yoke at the open end thereof. An additional bearing 4a mounted on the casing, Figs. 1 and 5, provides rigid support for the shaft 5 which carries at its inner end the yoke and associated apparatus. The ball which is located adjacent the face 2 for visual indication is adapted to be rotated by suitable motive means, such as a servomotor or synchronous repeater 9 that positions the ball through gearing generally indicated at 10 according to simulated pitch of an aircraft. Roll and pitch simulating means are shown for example in Patent No. 2,731,737 granted January 24, 1956 to R. G. Stern.

The pitch motor also positions through additional means a horizon bar 11, Figs. 1 and 3, that is pivotally mounted by means of lateral extensions 11a and 11b on the yoke arms respectively in bridging relation to the yoke. Thus the horizon bar is adapted to move across the ball at the instrument face as in practice. The horizon bar is driven by the pitch motor as hereinafter described so that it moves in opposite direction to the ball. The electrical connections for energizing the pitch and roll motors from external circuits form no part of the present invention and may include suitable slip ring connections, etc. such as indicated at 12 for example.

The above described apparatus has been used in varying forms in aircraft training apparatus, one form of which is shown by Patent No. 2,578,177 granted Dec. 11, 1951 to R. C. Dehmel.

The centering operation above referred to that is manually performed by the pilot comprises for the simulated gyro essentially the following steps: (1) centering of the yoke and roll shaft 5 so that the roll angle is represented as zero (the roll shaft is centered independently of the roll servomotor (not shown) through a simple friction clutch between the usual reduction gearing and the roll shaft so that angular adjustment of the shaft during centering does not affect the roll servo calibration); (2) centering of the pitch indicating ball 7 so that pitch is represented as in level flight (for this operation the pitch motor is braked so that the ball can be centered independently of the pitch motor also through a friction clutch and the calibration of the pitch motor is undisturbed); and (3) centering of the horizon bar and index so that it is horizontal and at the center of the dial. The gyro so centered represents an aircraft in perfectly straight and level flight.

The manually operated centering means comprises a knob 15 representing the "caging" control knob located on the instrument panel as indicated. This knob is connected to an operating rod 16 having an adjustable extension 16a to which is secured at 16b a carriage 17 near the opposite end. The carriage 17 which has an angular extension 17a bored to form two bearings is guided for sliding reciprocal movement on a pair of parallel guide rods 17b and 17c secured to the casing as indicated in Fig. 2, and carries two spaced off-set rollers 18 and 19 for purposes hereinafter described. The carriage 17 also carries an off-set member 20 having a camming roller 21, Figs. 1 and 5, arranged to engage the cam surface of a cylindrical cam member 22 that is rigidly secured to the roll shaft 5. The cam 22 has diametrically positioned high and low points, the low point being provided with a slot 23, Fig. 5, through which the camming roller 21 can move when the slot is in alignment therewith. It will be seen that when the knob 15 is pulled toward the left, as viewed, the roller 21 tends to rotate the cam 22, and hence roll shaft 5, to a point where the low point of the cam, i. e. slot 23, is in alignment with the roller 21. This point of alignment represents zero roll angle. When the roller 21 enters the slot 23, the roll shaft is temporarily locked in zero roll position and the yoke 6 is held horizontally positioned.

As the knob 15 is pulled outwardly by the pilot in continuous motion to simulate resetting or "caging," the resistance to the pull increases considerably during the final movement in simulation of the force required to erect the gyro. This resistance is partly represented by a compression spring 24 positioned between a collar 25 on the rod 16 and the gyro frame, and by the ball positioning cam presently described.

As the rod 16 is moved further to the left after centering of the roll shaft and yoke, it will be seen that the roller 18 on carriage 17 is now in alignment with a semicircular notch 18a formed at the right end, as viewed, of an elongated cam plate 26 that is slidably mounted by means of pin and slot connections on the yoke arm 6b. This cam plate is biased toward the right by a spring 27 secured to the yoke arm and is provided with a camming slot 28, Fig. 2, for controlling the position of a pin 29 extending freely through the yoke arm, Figs. 4 and 11, and into the slot.

Figure 11:
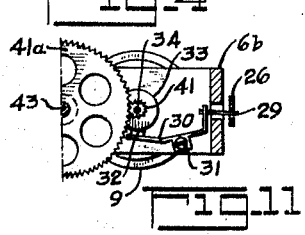
Fig. 11 is a detail view in section taken along the line 11—11 of Fig. 10 showing the brake mechanism of Fig. 4 in the braking position.

Referring now to Figs. 4 and 11, the pin 29 is connected to brake lever 30 that is pivoted in the yoke assembly at 31 so that depression of the pin 29 in the cam slot 28 due to lateral movement of the cam plate 26 toward the left, as viewed in Fig. 2 causes rotation of the brake lever 30 in clockwise direction so as to apply the brake shoe 32 to a brake drum 33 in turn connected to the shaft 34 of the pitch motor 9. This braking operation provides for resetting of the pitch indicator (ball) without disturbing the calibration of the pitch motor as above indicated, and is accomplished by the roller 18 engaging the cam plate notch 18a so that the cam plate 26 is caused to slide toward the left, thereby camming the pin 29 to the lower braking position indicated in Fig. 11. Thus far, the operating rod 16 has effected centering of the roll shaft and yoke, and braking of the pitch motor.

During movement of the resetting rod 16 toward the left, the roller 21 has moved through the roll cam slot 23 to the left of the cam; however the roll shaft immediately is re-locked in centered position by means of the off-set roller 19 on the carriage 17 arranged to move into an elongated notch 35 formed in an extension of the yoke arm 6b, Fig. 2. Thus, the yoke and roll shaft are held centered throughout the continued resetting movement of the rod 16.

As the knob 15 is pulled further toward the left, the cam plate 26, which is provided with a camming roller 36 at its extreme left end engages a cam 37 that is connected to the ball shaft 8. The cam 37 has a pair of high portions 37a and 37b symmetrically disposed with respect to an intermediate low portion 37c, the cam design being such that the camming roller 36 upon engaging a high portion tends to rock the cam to a position in which the low point 37c and the cam roller 36 are in exactly horizontal alignment. In this position the ball is centered and represented as in straight and level flight. The cam portions 37a and 37b are designed in conjunction with the compression spring 24 as above indicated so that the force required to erect a spinning gyro is closely simulated.

The resetting of the ball independently of the pitch motor 9 is accomplished by means of a friction clutch 40 located between the ball and gearing 10. Specifically, the gearing 10 includes a drive pinion gear 41 connected to the pitch motor shaft 34 and a driven gear 41a connected to a counter shaft 43, in turn connected to a bevel pinion gear 44 that engages a bevel gear 45 rigidly connected to the driving disc 46 of the friction clutch 40. The disc 46, through the bevel gear 45, is biased by a compression spring 47 into engagement with the driven clutch disc 48 that is in turn secured to the ball shaft 8, the bevel gear 45 and clutch disc 46 being freely mounted as a unit on the shaft 8.

It will therefore be seen that when the brake shoe 32 engages the pitch motor brake drum 33 so as to hold it against rotation during the resetting operation, the directly connected gearing 10, including the bevel gears 44 and 45 and the clutch plate 46, are held as a unit in fixed position. Accordingly when the ball shaft 8 is centered through the cam 37, the clutch disc 48 slips with respect to the fixed clutch disc 46 until the ball has been centered. At this point removal of the brake from the pitch motor enables a change in simulated pitch to be transmitted from the pitch motor directly through the above-described gearing and friction clutch 40 to the ball. The tension of spring 47 is suitably adjusted so that there is no clutch slippage for the normal drive connection, and excessive stress at the gearing and brake is avoided during the resetting operation. Since the parts to be operated are few in number and of small mass, the friction clutch 40 is a minor factor in the force required at the pull knob 15 during the resetting operation. As the ball of the specific gyro in question does not have free rotation through 360°, the clutch 40 also serves to provide slippage between the pitch motor and the ball when the ball engages a limit stop, thereby preventing damage to the gearing etc.

The horizon bar 11 is positioned between upper and lower limits at the dial face by means of a lost-motion connection generally indicated at 50, Fig. 12. The horizon bar 11 as previously indicated is pivotally mounted across the free end of the yoke, the bar extension 11a being pivoted at 11c at the inner side of yoke arm 6a and the opposite extension 11b being pivoted at 11d at the inner side of the opposite yoke arm 6b. The extension 11b has formed at its pivoted end an enlarged portion forming a ring 51 at the inner periphery of which is formed a yoke or forked portion 52. Normally positioned within the yoke is a pin 53 that is secured to a disc 54 in turn rigidly secured to the ball shaft 8. The arrangement is such that rotation of the ball shaft causes counter-rotation of the horizon bar 11 about the pivoted points 11c and 11d by means of the aforesaid pin and yoke connection. After rotation of the ball which would bring the horizon bar to the upper or lower part of the instrument face, as the case may be, the pin 53 slides out of the yoke 52 so that the bar remains in that position and further limited movement of the ball may take place. When the ball is again rotated in the opposite direction, the pin 53 moves into the yoke slot, which has remained in the same position, and continued movement of the ball causes the aforesaid pin and yoke connection to move the horizon bar across the face of the ball in a direction opposite to rotation of the ball as in practice.

The usual "airplane" indicia 55 at the instrument face may be adjusted vertically with respect to the zero index marking 55a, Fig. 1, by means of a rotatable knob 56 as in practice. The adjusting means is not shown as it may conform to the actual instrument and constitutes no part of the present invention.

Summarizing, the resetting operation with particular reference to Figs. 6–10 inclusive, the apparatus is shown in Fig. 6 as being in an un-centered condition with both the roll and pitch indicators representing material degrees of roll and pitch. Fig. 7 shows the horizon bar 11 indicating the right wing as down and the aircraft in a sharp dive position. Initiation of the resetting operation is indicated by Fig. 8 wherein the carriage 17 has moved the roller 21 so as to center the roll cam 22 and to bring the cam 18 into contact with the cam plate 26. At this point the roll shaft 5 and yoke are centered at zero roll and the yoke is now locked in such position by the carriage roller 19 that has entered the slot 35 in the yoke. The spring 24 is now under partial compression and the cam 37 remains in its original position. The zero roll position is indicated by the alignment of the fixed and movable roll indicators as shown in Fig. 9 with horizon bar 11 now in a horizontal position due to centering of the yoke. The pitch indicator still indicates a dive position. As the knob 15 is pulled further toward the left, the camming roller 36 engages the portion 37b of the ball cam 37, causing it to rotate clockwise until the roller 36 engages the low point 37c of the cam which forms a curved recess for the roller 36. This final operation of the resetting knob involves a material force as the operating surfaces of cam 37 are designed so that material force is required to rotate the cam through the camming plate 26. The spring 24 is now fully compressed, and the gyro is in fully centered position as indicated by Fig. 3 wherein both the roll and pitch indicators represent straight and level flight.

An important feature of the invention involves resetting of the roll and pitch indicators while maintaining the pitch motor, which may be a synchronous repeater, zeroed or electrically aligned with respect to the transmitter. This feature involves the operation of the friction clutch 40 in combination with the pitch motor braking mechanism above described, all operated in timed relation to the resetting operation. The tumbling of the gyro is simulated, say at the end of a "flight," by the instructor who by means of auxiliary electrical controls (not shown) arbitrarily positions as desired the pitch and roll indicating means. The pilot at the beginning of the next "flight" zeros the gyro as above described.

It should be understood that this invention is not limited to specific details of construction and arrangement thereof herein illustrated, and that changes and modifications may occur to one skilled in the art without departing from the spirit of the invention.

What is claimed is:

1. In aircraft training apparatus for simulating an attitude gyro having indicating means adapted to be positioned according to simulated pitch and roll attitudes, gimbal structure for bodily supporting said indicating means responsive to simulated roll, and means for independently operating said indicating means according to simulated pitch, the combination of means for manually resetting said apparatus from a simulated tumbled position to a zeroed position comprising a manual resetting member, means initially operable thereby for centering said gimbal structure to represent zero roll attitude, a cam member mounted for limited movement on said gimbal structure and spring-biased in one direction, means subsequently operable by said manual resetting member for engaging said cam member to move it against its spring bias, and a centering cam mounted on said gimbal structure and connected to the pitch indicating means arranged to be engaged by said cam member so as to position the indicating means to represent zero pitch attitude.

2. Apparatus as specified in claim 1 wherein the means for indicating pitch comprises a pitch servo that is connected in series to the pitch indicating means through a brake and friction clutch respectively, and means interconnecting the cam member and the brake for setting said brake to prevent operation of the pitch servo during operation of said pitch centering cam by said cam member.

3. Apparatus as specified in claim 1 wherein the manual resetting member has means for independently engaging the gimbal structure subsequent to the roll zeroing operation so as temporarily to lock it in zero roll position during zeroing of the pitch indicating means.

4. Apparatus as specified in claim 1 wherein the manual resetting member has a biasing spring opposing resetting movement, and the pitch centering cam is contoured so that the combined manual resetting force required is a maximum during the initial part of the pitch zeroing operation, thereby to simulate the characteristic force required to erect an actual gyro.

5. Apparatus as specified in claim 1 wherein the manual resetting means includes a carriage connected to the resetting member and slidably guided for reciprocal movement with respect to the gimbal structure, said carriage having mounted thereon a plurality of members adapted respectively to center the gimbal structure at zero roll position, operate the pitch centering cam to the zero pitch position and temporarily lock the gimbal structure in said position during the zeroing of the pitch indicating means.

6. In aircraft training apparatus for simulating an attitude gyro having indicating means adapted to be positioned according to simulated pitch and roll attitudes, means for bodily supporting said indicating means responsive to simulated roll and means for independently operating said indicating means according to simulated pitch, the combination of means for manually resetting said apparatus from a simulated tumbled position to a zeroed position comprising a manual resetting member, said pitch operating means and the pitch indicating means being interconnected through series-connected brake and clutch means respectively so that when the brake is set the pitch indicating means can be zeroed independently of the pitch operating means, and means connected to said manual resetting member for sequentially centering said supporting means to represent zero roll, setting said brake and centering the pitch indicating means to represent zero pitch attitude.

References Cited in the file of this patent
UNITED STATES PATENTS

| | | |
|---|---|---|
| 2,379,869 | Baker | July 10, 1945 |
| 2,578,177 | Dehmel | Dec. 11, 1951 |
| 2,655,046 | Seifried | Oct. 13, 1953 |

OTHER REFERENCES

Postlethwaite: An Italian Artificial Horizon, Aircraft Engineering, October 1944, pages 288, 289.